United States Patent [19] [11] 4,071,872

Phillips, Jr. [45] Jan. 31, 1978

[54] INTERRUPTER

[76] Inventor: Charles M. Phillips, Jr., 315 Haven St., Clearwater, Fla. 33516

[21] Appl. No.: 713,844

[22] Filed: Aug. 12, 1976

[51] Int. Cl.$^2$ .............................................. H02H 3/20

[52] U.S. Cl. ........................................ 361/56; 361/55; 361/91; 361/118; 337/28; 337/31; 337/34; 339/14 P

[58] Field of Search ...................... 361/56, 55, 118, 91, 361/117, 119, 124; 337/197, 198, 28, 34, 32, 33; 339/14 P, 111, 147 P, 75 P, 176 P

[56] References Cited

U.S. PATENT DOCUMENTS

| | | | |
|---|---|---|---|
| 1,930,865 | 10/1933 | Statler et al. | 361/117 X |
| 2,538,177 | 1/1951 | Vigren et al. | 361/56 X |
| 2,597,600 | 5/1952 | Shapiro | 337/198 X |
| 2,988,617 | 6/1961 | Graziosi | 337/197 |
| 3,497,850 | 2/1970 | Gallo, Sr. | 337/197 |
| 3,539,961 | 11/1970 | Worthington | 337/197 |
| 3,840,781 | 10/1974 | Brown | 361/58 |

*Primary Examiner*—J D Miller
*Assistant Examiner*—Patrick R. Salce
*Attorney, Agent, or Firm*—Fidelman, Wolffe & Waldron

[57] ABSTRACT

A device for protecting electrical appliances from electrical surges having male prong members to connect the device to an electrical wall outlet; a female receptacle to receive a plug of the appliance; a self-restoring, current diverting spark gap means for interrupting current at the female receptacle at a predetermined voltage level.

3 Claims, 7 Drawing Figures

INTERRUPTER

BACKGROUND OF THE INVENTION

1. Field of the Invention

This invention relates generally to electrical protective devices and, more particularly, to a device for interrupting electrical current to an electrical appliance and the like for excess values of electrical current.

2. Description of the Prior Art

When most electrical appliances are connected to the usual wall receptacle they are connected electrically to a power line without any protection against surges of electric current which might seriously damage them. Generally, the only safety devices in these power lines are fuses or circuit breakers which are adapted to burn out or open when the lines that they service sense a current overload. These devices are not adequate to protect appliances since a current overload which might be less than required to open the circuit breaker or burn out a fuse might still be great enough to damage the appliance. Typically, these current overloads result from voltage surges caused by lightning striking the structure in which these appliances are housed, or by striking an exposed power line.

A solution to this problem is the isolator presented by James F. Worthington in U.S. Pat. No. 3,539,961. The isolator had a male plug member and a female receptacle electrically interconnected by fusible wire. An arc plate, connected to a third prong, is disposed adjacent the male prong members of the isolator so when current in excess of a predetermined value flows through the device, the fuse wire is melted or burned out and the current is carried by the arc plate to ground, thereby effectively isolating the appliance and saving it from damage. In actual practice, the fusible wire did not consume itself rapidly enough to prevent excess, damaging current from reaching the appliance. Also, the fusible wire was not self-restoring and needed replacement by a technician.

Another solution to this problem is presented in my pending application, INTERRUPTER, Ser. No. 644,422, filed Dec. 24, 1975, wherein a voltage responsive resistive element, e.g. varistor, carbon pellet arrester, gas ionization tube, is used to short circuit the female receptacle when a power surge condition occurs. This is an improvement over the isolator of Worthington, in that it is faster and self-restoring; however, the varistors and carbon pellets when heated by high current flow are relatively slow to regain their normal operating characteristics, and the gas ionization tube does not extinguish until voltage has fallen to a low level. Thus, there exists a need for a low cost current interrupter which is self-restoring and faster acting.

SUMMARY OF THE INVENTION

The present invention is a self-restoring, fail-safe, current interrupting device for use with household appliances. The device includes a housing which supports a plurality of prong means adapted to be inserted in a electrical outlet, and a female receptacle adapted to be electrically connected to an appliance. A pre-set spark gap is connected between the hot line and the neutral line within the device to provide a low resistance path when the voltage exceeds a predetermined level and thereby interrupts the current flow to the female receptacle.

Two male prong means extend perpendicularly from the rear wall, and connect with contacts in the female receptacle. The male prong means and contacts extend perpendicularly in opposite direction from opposite ends of a conductive element. The grounding prong means is generally L-shaped, extends parallel to the rear wall, and is connected to the grounding female contact by a conductive element. Each male prong means, the corresponding female contact and each conductive element is unitary, being formed from a single piece of conductive material.

OBJECTS OF THE INVENTION

An object of the present invention is to provide an economical electrical surge protection device for household appliances.

Another object is to provide a self-restoring electrical surge protection device for appliances.

A further object of the invention is to provide a fail-safe electrical surge protection device having a minimum number of parts and which is usable with two aperture outlets.

Other objects, advantages, and novel features of the present invention will become apparent from the following detailed description of the invention when considered in conjunction with the accompanying drawings.

DESCRIPTION OF A PREFERRED EMBODIMENT

Figure 1:
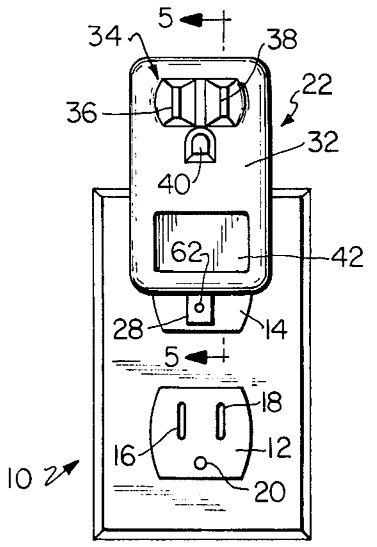
FIG. 1 is a pictorial illustration of an interrupter constructed according to the invention installed in a wall outlet.
Figure 2:
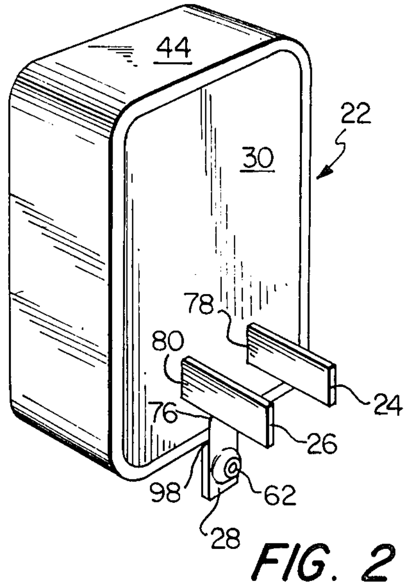
FIG. 2 is a perspective view of the interrupter of FIG. 1.

Referring now to the drawings for a detailed description of the invention, FIG. 1 shows a typical electrical wall outlet 10 having two female receptacles 12 and 14. As can be seen for female receptacle 12, three apertures are provided having a hot aperture 16, a neutral aperture 18 and a grounded aperture 20. Plugged into the three apertures of female receptacle 14 is a preferred embodiment of the current interrupter 22 of the present invention. In use male prongs 24 and 26 and grounding prong 28, illustrated in FIG. 2, are received in apertures 16, 18 and 20, respectively, of a wall outlet. As can be seen from FIG. 2, a hot male prong 24 and a neutral male prong 26 extend generally perpendicular from the back wall or plate 30 of the interrupter 22 and the ground prong 28 extends generally parallel to the back wall or plate 30 of the interrupter 22. On the front wall 32 of the interrupter 22 is a female receptacle 34 having hot, neutral and ground apertures 36, 28 and 40, respectively. A small recess 42 is also provided in the front wall 32 for attachment of a plate containing printed matter such as a tradename, instructions, rating, etc. As will be explained more fully below, the electrical appliance which is to be protected from voltage and current surges is plugged into female receptacle 34.

As can be seen from FIGS. 1 and 2, the interrupter 22 is designed so that it fits entirely within a housing containing two pieces, i.e., back plate 30 and a five sided housing 44. These two pieces are preferably made of high impact plastic material or any equivalent electrically insulated material. The only externally visible electrical parts of the device are the male prongs 24, 26 and 28 which extend from the lower portion of the housing and the female receptacle 34 on the face of the housing. Thus, a compact non-obstrusive protective device is provided. The minimum number of parts needed for the assembly and operation of the interrupter will be discussed in reference to FIGS. 3, 4 and 5.

Figure 3:
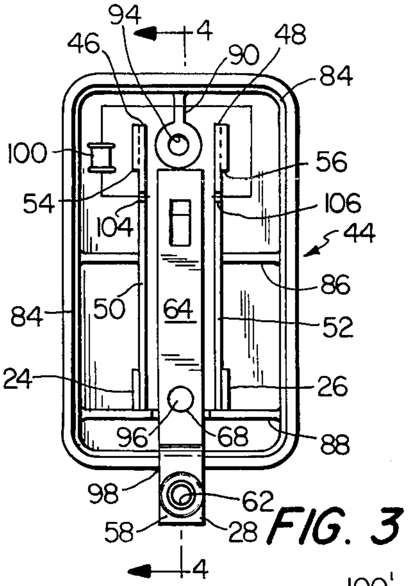
FIG. 3 is a rear elevational view of the interrupter of FIG. 1 with the back plate removed.
Figure 4:
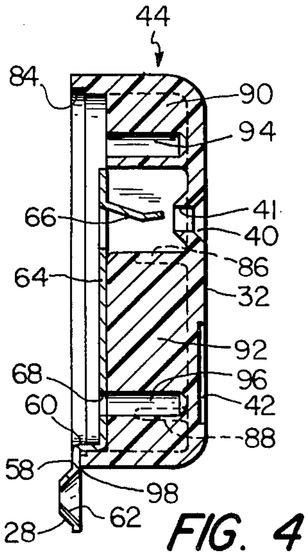
FIG. 4 is a sectional view of the interrupter housing and grounding prong taken along line 4—4 of FIG. 3.
Figure 5:
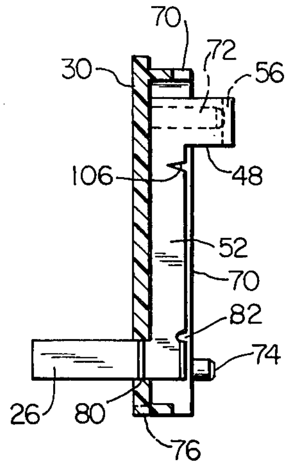
FIG. 5 is a sectional view of the back plate and grounding prong of the interrupter taken along line 5—5 of FIG. 1.

As illustrated specifically in FIGS. 3 and 5, the male prongs 24 and 26 are connected to contacts 46 and 48, respectively, of female receptacle 34 by conductive elements 50 and 52, respectively. The ends of the female contacts 46 and 48 are slightly beveled at 54 and 56. Each male prong and the connected female contact and conductive element is a unitary component being formed of a single piece of conductive material, for example, brass. The male prongs, 24 and 26, extend essentially perpendicularly from one end of the conductive elements, 50 and 52, respectively, in a first direction and the female contacts 46 and 48 extend essentially perpendicular from the other end of conductive elements 50 and 52, respectively, in a direction opposite of the male prongs 24 and 26. As will be explained below in a detailed description of the back plate 30 and housing 44, the unitary conductive structures of the present invention are held in place and electrically insulated from each other by the internal structure of the housing and back plate and no additional insulation or fasteners are needed.

The grounding prong 28 is generally L-shaped having a longer portion 58 and a shorter portion 60. The longer portion 58, which is generally parallel to the back plate 30 of the housing and generally perpendicular to the bottom of the housing, has an aperture 62 therein. As can be seen in FIG. 1, the aperture 62 is located relative to the housing and the other prongs 24 and 26 so as to lie in the ground aperture 20 of female receptacle 14 when connected to a wall outlet 10. If the interrupter is used in a two aperture female receptacle, the ground prong 28 may be connected to any other ground using the aperture 62 and a fastener. The short portion 60 of the L-shaped prong 28 extends at a right angle from a rectangular conductive element 64. Extending from and adjacent to the other end of conductive element 64 is a female ground contact 66 which extends below the roof surface 41 of the ground aperture 40, FIG. 4, of a female receptacle 34. As with the hot and neutral prongs and female contacts, the grounding prong 28, the conductive element 64 and the female contact 66 are unitary, being formed of a single piece of conductive material. An aperture 68 is provided in the conductive element 64, as to be explained more fully, so as to help retain the ground element in place.

The back 30 of the housing, as illustrated in FIG. 5, is a generally rectangular surface having a ridge 70 adjacent to the edge of the surface and forming a recessed interior region. A pair of pins 72 and 74 extend from the center of the back 30 and are constructed so as to press fit into apertures in the housing 44. A rectangular opening 76 is provided in the back plate 30 to allow the contact 28 to extend from the housing. Apertures 78 and 80 are also provided in the plate 30 so as to allow male prongs 24 and 26 to extend therefrom. Adjacent apertures 78 and 80 and forming interior portions of ridge 70 are a pair of walls 82 surrounding pin 74. These walls align the prongs 24 and 26 relative to the apertures 78 and 80 and help insulate the conductive portions 50 and 52 from each other.

The main portion of the housing 44 is a five sided generally rectangular closure. An internal shoulder 84 is provided adjacent the external wall so as to receive the back plate 30 of the housing with the ridge 70 lying adjacent to the internal portion of the side walls of housing 44. The interior of housing 44 includes transverse ribs 86 and 88 and longitudinal ribs 90 and 92. Transverse ribs 86 and 88 are of sufficient height to support conductive elements 50 and 52 and ribs 90 and 92 are of sufficient height to support the grounding conductive elements 64. Also provided as a portion of ribs 90 and 92 are apertures 94 and 96 which receive, in a force fit relationship, pins 72 and 74 of the back plate 30. Aperture 68 of the grounding conductive element is superimposed or aligned with aperture 96. A rectangular opening 98 is provided in the bottom side wall of the housing 44 to allow a portion 58 of the male grounding prong 28 to extend from the housing.

Electronic circuitry which provides the interruption of current between the male prongs 24, 26 and the female outlet 34 is illustrated in FIG. 3, as including a voltage responsive spark gap element 100. The leads of the spark gap element are received in slots 104 and 106, respectively, of conductive elements 50 and 52 (see FIG. 5). Thus, the voltage responsive spark gap element 100 forms a circuit between the electrically hot conductive element 50 and the neutral conductive element 52.

The voltage responsive spark gap element 100 has an open gap of preselected width such that at normal operating voltages no current will flow between the hot and neutral line through the spark gap element 100. Thus, the flow of current from the male prongs to the female receptacle is uninterrupted. When a high voltage occurs across the lines between the conductive elements 50, 52, for example, by a power surge due to a power malfunction or lightning, and the voltage exceeds the value which causes arcing across the preselected gap width of the spark gap element 100, a low resistance path is created between the conductive elements 50, 52 thereby diverting and interrupting the current which otherwise flows from the male prongs 24, 26 to the female receptacle 34. This arcing effectively isolates the appliance device which is plugged into the female receptacle 34 from the power lines and from the power surge. Once the power surge has dissipated and the voltage across the power line and prongs 24, 26 returns to its normal value, the arc across the spark gap extinguishes and the spark gap element 100 is again an open circuit. Thus, current flows freely again from the male prongs 24, 26 to the female receptacle 34.

A pre-set spark gap enclosed in plastic with appropriate leads, Model A595 Lightning Arrestor, Parker-McCrory Manufacturing Company, Kansas City, Missouri, has performed satisfactorily as part of the instant invention.

In an alternative embodiment of this invention (not shown) a resistor may be used in series with the spark gap element 100 to limit the flow of current during arcing. A one ohm resistor has performed satisfactorily.

As can be seen from the detailed description of the preferred embodiment of the present invention, a minimum of parts, i.e., a unitary housing with a back plate, three unitary electrical conductors including male prongs and female contacts, and a pre-set spark gap are used to provide an inexpensive and compact current interrupter to protect electrical equipment from voltage surges on the power line. By providing unitarily formed elements and eliminating excess connectors, fasteners, etc., the cost of the present interrupter is reduced and reliability extended.

In an alternative embodiment of this invention (FIG. 6) a plurality of spark gap elements are connected, one between each conductive element 50', 52' and the ground element 64'. Corresponding parts are indicated by a prime (') marking. When the voltage between a conductive element and ground exceeds the voltage which causes arcing across the spark gap, the current is diverted from the female receptacle 34 and flows to ground. When the voltage diminishes to normal levels, normal current flow resumes automatically.

In another alternative embodiment of this invention (FIG. 7) a plurality of spark gap elements are connected, one between each conductive element 50'', 52'' and the ground element 64' and one between the conductive elements 50'', 52''.

Figure 6:
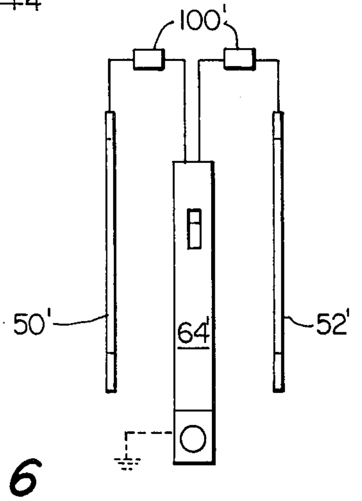
FIGS. 6 and 7 are semi-schematic circuits of alternative embodiments of this invention.
Figure 7:
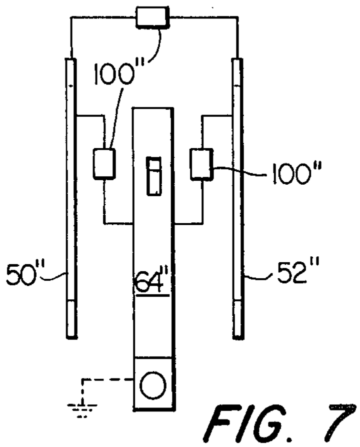

In still other alternative embodiments of this invention the spark gap elements, as seen in FIGS. 6 and 7, may be connected, each with a small resistor in series to limit current flow during arcing.

While the interrupter has been described with reference to an embodiment having a female receptacle for two active prongs and a male plug member with two electrically conductive prongs and a ground prong, the invention can also be practiced in embodiments where the female receptacle has more than two active blades and the male plug member has, more or less, three prongs.

From the preceding description of the preferred embodiment, it is evident that the objects of the invention are attained and although the invention has been described and illustrated in detail, it is to be clearly understood that the same is by way of illustration and example only and is not to be taken by way of limitation. The spirit and scope of this invention is limited only by the terms of the appended claims.

What is claimed:

1. An interrupter device for interrupting electrical current used by a household electrical appliance comprising:

a housing supporting a plurality of prong means adapted to be inserted into an electrical outlet and a female receptacle adapted to receive the electrical plug connector of an appliance;

a plurality of conductive elements for electrically interconnecting each of said prong means to a corresponding element of said female receptacle wherein one of said conductive elements is rectangulår having an L-shaped grounding prong means extending from one end of said conductive element in a first direction and a contact portion extending from the other end of said conductive element in a direction opposite said first direction; and spark gap means connected between two conductors of said interconnecting conductor means for interrupting current flow to said female receptacle at a predetermined voltage level by creating a path of low resistance between said two interconnecting conductor means.

2. The interrupter device of claim 1 wherein said L-shaped grounding prong means includes an orifice adapted to be superimposed on the ground aperture of a three aperture electrical outlet when said two prong means are inserted in a three aperture electrical outlet.

3. The interrupter device of claim 1 wherein said housing being a substantially rectangular six sided closure having a front wall, a bottom wall and back wall; said front wall including three apertures for said female receptacle, said rear wall having two apertures and two of said prong means extend through said apertures substantially perpendicular to said rear wall, and said bottom wall includes an aperture and said grounding prong means extends through said aperture substantially perpendicular to said bottom wall.

* * * * *